United States Patent [19]

Kaneda et al.

[11] Patent Number: 4,591,919
[45] Date of Patent: May 27, 1986

[54] AUTOMATIC FOCUS CONTROL SYSTEM AND CAMERA USING SAME

[75] Inventors: Naoya Kaneda, Kanagawa; Masamichi Toyama; Susumu Kozuki, both of Tokyo; Yutaka Kohtani; Akihiro Fujiwara, both of Kanagawa, all of Japan

[73] Assignee: Canon Kabushiki Kaisha, Tokyo, Japan

[21] Appl. No.: 536,369

[22] Filed: Sep. 27, 1983

[30] Foreign Application Priority Data

Sep. 30, 1982 [JP] Japan .................. 57-171923

[51] Int. Cl.$^4$ .................. H04N 5/232; G01J 1/20; G01J 1/36; G03B 13/18
[52] U.S. Cl. .................. 358/227; 250/204; 354/402; 354/403; 250/201
[58] Field of Search .................. 358/227; 354/403, 402; 352/140; 250/201, 201 PF, 201 AF, 201 DF, 204

[56] References Cited

U.S. PATENT DOCUMENTS

| 4,126,871 | 11/1978 | Tamura et al. | 354/402 |
| 4,341,953 | 7/1982 | Sakai et al. | 354/409 X |
| 4,361,390 | 11/1982 | Yamada | 354/409 X |
| 4,423,936 | 1/1984 | Johnson | 354/403 |
| 4,453,812 | 6/1984 | Suzuki et al. | 354/403 |
| 4,491,402 | 1/1985 | Suzuki | 250/204 |

Primary Examiner—Michael A. Masinick
Assistant Examiner—E. Anne Toth
Attorney, Agent, or Firm—Toren, McGeady, Stanger, Goldberg & Kiel

[57] ABSTRACT

Disclosed is an automatic focus control system including an active type automatic focusing device. The system further includes detecting apparatus which produces a characteristic signal when detecting that an image forming optical apparatus is in an out-of-focus condition, and control means which renders the automatic focusing device in an inoperative condition when the optical apparatus reaches an in-focus condition. It also renders the focusing device in an operative condition in response to the characteristic signal produced by the detecting apparatus.

32 Claims, 5 Drawing Figures

AUTOMATIC FOCUS CONTROL SYSTEM AND CAMERA USING SAME

BACKGROUND OF THE INVENTION

1. Field of the Invention:

This invention relates to an automatic focus control system and more particularly to an automatic focus control system including an active type automatic focusing device which automatically adjusts the focal point of an optical system by projecting a signal on an object and receiving a resultant reflected signal; and also to a camera using this focus control system.

2. Description of the Prior Art:

There have been proposed active type automatic focusing devices of various kinds. It is known that still picture cameras, 8 mm motion picture cameras, video cameras, etc. are using such active type automatic focusing devices. However, the various kinds of conventional active type focusing devices consume an extremely large amount of power. Because, in order to secure a sufficiently high degree of performance, they require a high output for signal projection whether or not the signal to be projected on an object is a light or an ultrasonic wave. Although high output infrared ray emitting diodes (IRED) and the like have recently been developed, their power consumption still remains large. This is a serious problem especially for motion picture cameras, portable video cameras and the like which must have an automatic focusing device constantly operative during photography. When using portable video cameras in particular, the importance of portability increases and, accordingly, their power source capacity is further limited. Therefore, great power consumption by the above active type focusing devices is becoming more serious.

It is an object of the present invention to provide a novel automatic focus control system which eliminates the above prior art shortcoming.

It is another object of the invention to provide a novel automatic focus control system capable of greatly reducing power consumption, although the system includes an atuomatic focusing device of the active type which intrinsically causes large power consumption.

It is a further object of the invention to provide an advantageous automatic focus control system which is capable of greatly reducing power consumption by a rational method of actuating a focusing device only when necessary.

Another object of the invention is to provide a camera advantageously using the above novel automatic focus control system.

Still another object of the invention is to provide an advantageous video camera or a TV camera using the above novel automatic focus control system.

These and further objects and features of the invention will become apparent from the following detailed description of preferred embodiments thereof taken in conjunction with the accompanying drawings.

SUMMARY OF THE INVENTION

To attain these objects, an automatic focus control system arranged according to the present invention in a preferred embodiment thereof includes an active type automatic focusing means which automatically adjusts the focus of an optical system; detecting means for detecting deviation of the optical system from an in-focus condition after it is set in the in-focus condition; and control means which renders the automatic focusing means inoperative when the optical system reaches the in-focus condition. It again renders the automatic focusing means operative in response to the detecting means.

To attain the last two specific objects of the invention, a video camera or a TV camera arranged according to the present invention as a preferred embodiment thereof includes an active type automatic focusing means which automatically adjusts the focus of an optical system; detecting means for detecting, on the basis of an image signal obtained from image pick-up means, deviation of the optical system from an in-focus condition after the optical system has been set into the in-focus condition; and control means which renders the automatic focusing means inoperative when the optical system reaches the in-focus condition and renders the automatic focusing means again operative in response to the detecting means.

DETAILED DESCRIPTION OF THE PREFERRED EMBODIMENTS

The two embodiments of the present invention below concern video cameras equipped with automatic focusing devices of the light projecting active type according to the invention. However, it is to be understood that the invention is, of course, not limited to these applications.

Figure 1:
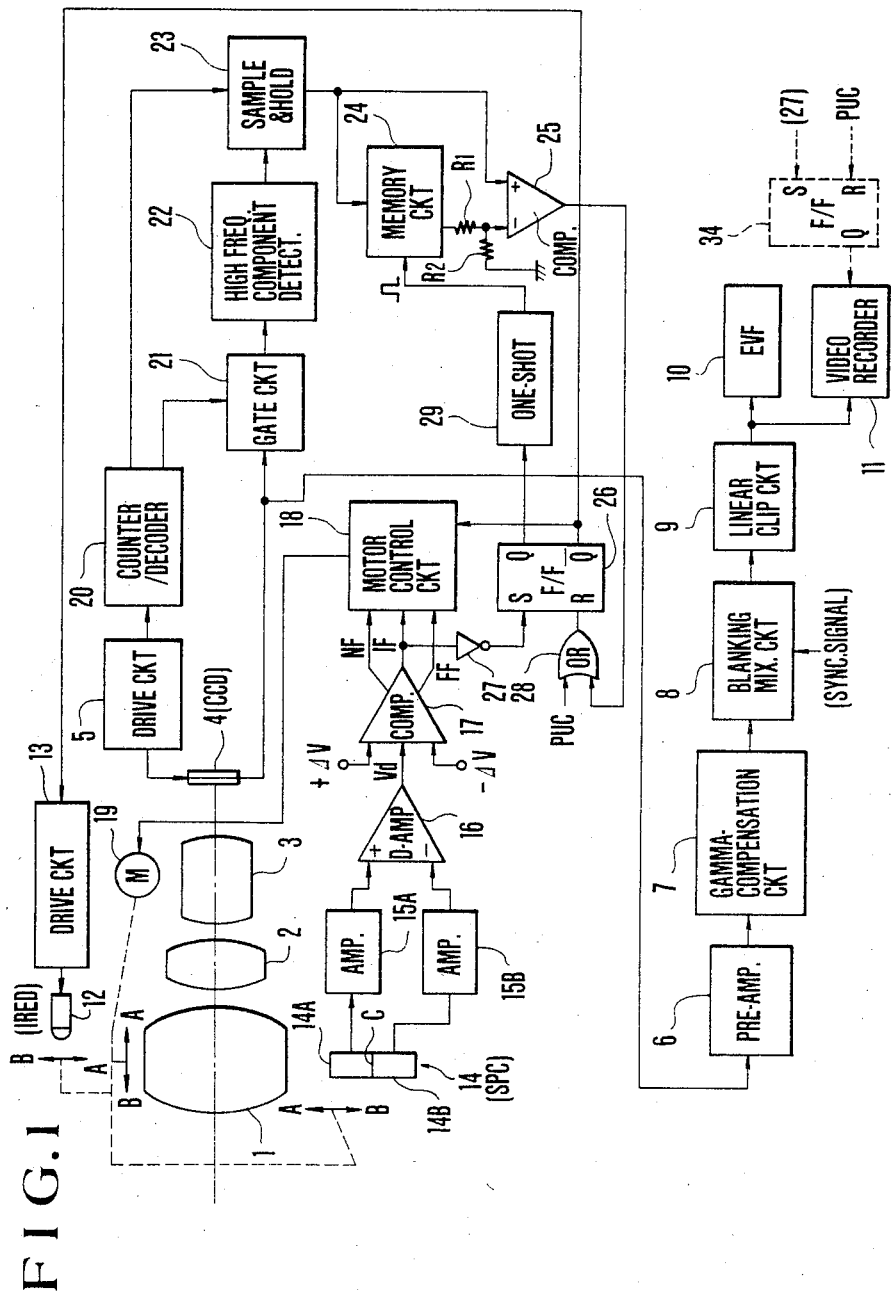
FIG. 1 is a block diagram showing the electrical circuit arrangement of a first embodiment of the invention.

Referring to FIG. 1, the first embodiment is arranged as follows: A group of lenses 1, 2 and 3 form a picture-taking optical system. The front lens 1 is movable along an optical axis for the purpose of focusing. A solid-state image pick-up element (image sensor) 4, which is a CCD or the like, scans an image of an object formed by the picture-taking optical system 1-3. A driver circuit 5 drives the solid-state image pick-up element 4. The circuit arrangement of FIG. 1 includes a pre-amplifier 6 for processing a scanning signal; a gamma compensation circuit 7; a blanking mixing circuit 8; a linear clipping circuit 9; and an electronic view finder 10. These elements are arranged in the manner of a CCD video camera. A reference numeral 11 identifies a video signal recorder. The embodiment includes a light emitting element 12 such as an IRED, as mentioned in the foregoing. The light emitting element 12 projects infrared rays on an object. A light emitting element driving circuit 13 activates the element 12. A light sensitive element 14 detects infrared rays reflected from the object after infrared rays are projected by the light emitting element 12. The light sensitive element 14 is, for example, a silicon photo-cell and consists of two discrete light receiving parts 14A and 14B. The light emitting element 12 and the light sensitive element 14 are arranged in the following manner in relation to displacement of the focusing lens 1: When the picture-taking optical system 1-3 is in an in-focus condition relative to an object, the light projected from the light emitting element 12 is reflected by the object and impinges on a boundary C between the light receiving parts 14A and 14B of the light sensitive element 14. The reflected light impinges more on the light receiving part 14A than on the other light receiving part 14B when the picture-taking optical system 1-3 is in a near-focus condition in which the focus of the optical system is nearer than the object. Conversely, it impinges more on the other light receiving part 14B when the picture-taking optical system is in a far-focus condition in which the focus is farther than the object. This arrangement is known and therefore requires no further description here. In front of the light projecting element 12 and the light sensitive element 14 are respectively arranged a light projecting lens, a light receiving lens and, if necessary, infrared transmission filters or the like. Amplifiers 15A and 15B amplify respectively the outputs of the light receiving parts 14A and 14B of the light sensitive element 14. A differential amplifier 16 produces a difference Vd (=15Aout−15Bout) between the outputs of the amplifiers 15A and 15B. A reference numeral 17 identifies a comparison circuit which compares the output Vd of the differential amplifier 16 with a predetermined reference level range from $-\Delta V$ to $+\Delta V$. The comparator 17 (for example, window comparator) is arranged such that the level of an output IF of the comparator 17 becomes high when the result of comparison is $-\Delta V \leq Vd \leq \Delta V$; the level of an output NF thereof becomes high when the result of comparison is $Vd \leq +\Delta V$; and the level of an output FF thereof becomes high when the result of comparison is $Vd \leq -\Delta V$. The high level of the output IF represents an in-focus condition, the high level of the output NF a near-focus condition and the high level of the output FF a far-focus condition respectively. A motor control circuit 18 controls the forward rotation, reverse rotation and stopping of a focusing lens driving motor 19 on the basis of the output of the above comparison circuit 17. For example, the motor 19 rotates forward in response to the high level of the output NF of the comparison circuit 17 driving the focusing lens 1 in the direction of arrow A, i.e. toward a greater focusing distance position. In response to the high level of the output FF, the motor control circuit 18 reverses rotation of the motor 19 to drive the lens 1 in the direction of arrow B, i.e. shifting it to a closer focusing position. In case of the high level of the output IF of the comparison circuit 17, the motor control circuit 18 stops the motor 19 in response to the output IF. As is known, the motor control circuit 18 may be formed, for example, by a complementary connection arrangement of transistors, etc. Meanwhile, the light emitting element 12 and the light sensitive element 14 also shift their positions in the directions of arrows A and B in association with the shift of the focusing lens 1 in the directions A and B. In this embodiment, the elements 12-19, which have been described above, constitute an active type automatic focusing device.

A gate circuit 21 is controlled by the output of a counter/decoder 20, counting image pick-up element driving clock pulses produced from the above driver circuit 5. The gate circuit 21 is controlled in such a manner that, out of the scanning output of the image pick-up element 4, an output portion that corresponds to a region 4b within the effective image sensing surface 4a of the image pick-up element 4 is removed by the gate circuit 21. A high frequency component detection circuit 22 detects a high frequency component contained in the scanning output taken out via the gate circuit 21. A sample-and-hold circuit 23 is responsive to the output of the counter/decoder 20 and samples-and-holds the output of the high frequency component detection circuit 22 upon completion of one scanning process on the object image, that is, at every vertical synchronization. A memory circuit 24 is responsive to a control pulse produced via a circuit arrangement which when the picture-taking optical system 1-3 reaches an in-focus state. The circuit 24 stores the output of the sample-and-hold circuit 23 obtained at that instant in response to the control pulse. Voltage dividing resistors R1 and R2 are provided for the purpose of obtaining an output level which is a slightly lower than, i.e. about 80% of, the output of the above memory circuit 24. A comparator 25 compares the output of the sample-and-hold circuit 23 with the output of the memory circuit 24, which is voltage divided through the resistors R1 and R2. When the former, i.e. the output of the sample-and-hold circuit 23, becomes lower than the latter, the output level of the comparator 25 changes from a high to a low level.

The high frequency of the image scanning output is correlated to the sharpness of the image. The high frequency increases with the sharpness of the image. Therefore, the output level of the high frequency component detection circuit 22 increases as the image sharpness increases. Accordingly, when the picture-taking optical system 1-3 reaches an in-focus condition, the high frequency component detection circuit 22 output level obtained at that instant is stored at the memory circuit 24. Meanwhile, an allowable in-focus range is preset, for example, within about 20% of the high frequency component detection level stored when the in-focus condition is attained. With the allowable range preset in this manner, about 80% of the memory circuit 24 output level is considered to be a reference level. When a high frequency component detection level obtained thereafter is lower than this reference level, the picture-taking optical system 1-3 is judged to have deviated from the in-focus condition.

Figure 3:
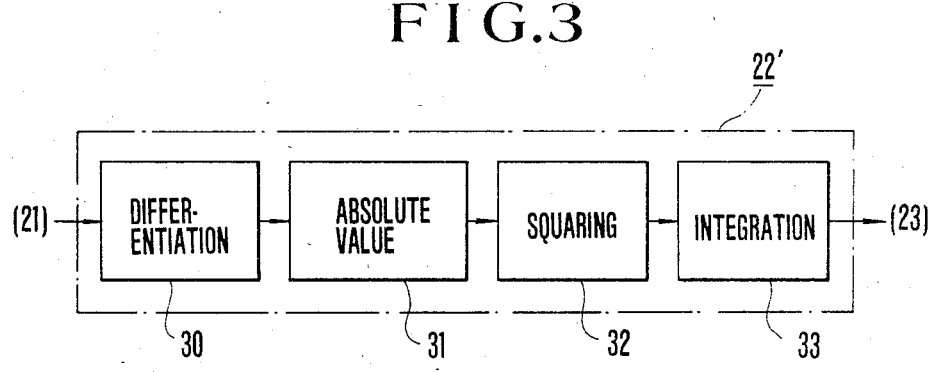
FIG. 3 is a block diagram showing in another embodiment the essential circuit elements required for the detection of the out-of-focus condition of the arrangement shown in FIG. 1.

With the image sharpness thus detected on the basis of the image scanning output, the above high frequency component detection circuit 22 may be replaced with some other circuit. An example of another circuit that is used in place of the high frequency component detection circuit 22 is shown by a circuit arrangement 22' in FIG. 3. In FIG. 3, the image scanning output is first differentiated by a differentiation circuit 30. The output of the differentiation circuit 30 is processed into an absolute value via an absolute value obtaining circuit 31. The absolute value thus obtained is squared by a squaring circuit 32. The output of the squaring circuit 32 is integrated by an integration circuit 33.

Furthermore, when a narrower allowable in-focus range is desired, the voltage dividing ratio of the above resistors R1 and R2 may be increased, for example, up to 0.9 or thereabouts. The voltage dividing ratio, thus, may be set as desired depending on the desired allowable in-focus range.

In this specific embodiment, the elements 20–25 and the resistors R1 and R2 jointly form detecting means for detecting the deviation of the picture-taking optical system 1–3 from an in-focus condition after the in-focus condition has been obtained. In other words, they form a so-called passive type focus detecting means.

The embodiment further includes an RS-flip-flop 26 of the fall synchronizing type. The flip-flop 26 is set when the output level of an inverter 27, which inverts the output IF of the above-stated comparison circuit 17, changes from a high to a low level. The flip-flop 26 is reset by a power-up-clear pulse produced from a known power-up-clear circuit (not shown) when the power source is turned on. It is also reset when the output level of an OR gate 28, which receives the output of the comparator 25, changes from a high to a low level. A one-shot circuit (a monostable multivibrator) 29 produces a single pulse in response to a high level output Q of the above-stated flip-flop 26. The output of the one-shot circuit 29 is applied to the above memory circuit 24 as a control pulse. The output $\bar{Q}$ of the flip-flop 26 is applied to the above light emitting element driving circuit 13 and the motor control circuit 18 as a control signal. These circuits 13 and 18 operate when the level of this output $\bar{Q}$ is high and become inoperative when the level is low. More specifically, these circuits 13 and 18 are arranged, for example, in the following manner: Switching transistors are arranged in the power supply line for the circuits 13 and 18 to be turned on by the high level output $\bar{Q}$ of the flip-flop 26 and to be turned off by the low level output $\bar{Q}$ of the flip-flop 26, so that the operation and non-operation of these circuits 13 and 18 can be controlled by the flip-flop 26.

In this specific embodiment, the operation of the above automatic focusing device 12–19 is stopped mainly by the above flip-flop 26 when the picture-taking optical system 1–3 reaches an in-focus condition. Furthermore, the automatic focusing device is re-actuated in response to an output of the detecting means 20–25, and the resistors R1 and R2 which detect deviation of the picture-taking optical system 1–3 from the in-focus condition.

With the embodiment arranged as above, when the power source of the camera is turned on, the power-up-clear circuit, which is not shown, produces the power-up-clear pulse. The pulse resets the flip-flop 26 via an OR gate 28. The level of the output $\bar{Q}$ of the flip-flop 26 then becomes high. As a result, the light emitting element driving circuit 13, the motor control circuit 18 and, the automatic focusing device 12–19 begin to operate. The light emitting element driving circuit 13 then emits a light from the light emitting element 12. The light is projected via the light projecting lens, which is not shown, onto an object and is reflected thereby. The reflected light is then detected by the light sensitive element 14 via the light receiving lens, which is not shown. Then, the level of the output NF of the comparison circuit 17 becomes high if the picture-taking optical system 1–3 is in a near-focus condition. In this instance, the motor control circuit 18 rotates the motor 19 forward, which in turn shifts the focusing lens 1 in the direction of arrow A, i.e. toward a greater distance focusing position. Conversely, in a far-focus condition, the level of the output FF of the comparison circuit 17 becomes high reversing rotation of the motor 19. The focusing lens 1 is then shifted in the direction of arrow B, i.e. toward a shorter distance focusing position.

Figure 2:
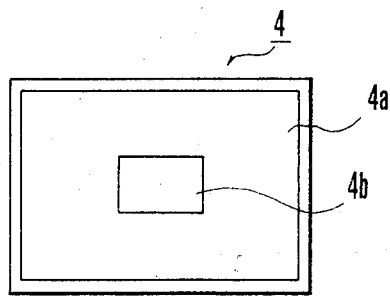
FIG. 2 is a schematic illustration showing a detection region provided for detecting an out-of-focus condition on the image sensing surface of an image pick-up element in the arrangement shown in FIG. 1.

Meanwhile, the driver circuit 5 drives the image pick-up element 4 to scan an image of the object formed by the picture-taking optical system 1–3. A scanning output thus obtained is processed by a known video signal processing system formed by the elements 6–9. After processing, the scanning output is applied to the electronic view finder 10, which then displays a picture thus taken. Furthermore, the scanning output is recorded as necessary by the recorder 11. Then, under the control of the counter/decoder 20, a portion of the scanning output corresponding to the detection region 4b of the image sensing surface 4a of the image pick-up element 4, which is shown in FIG. 2, is taken out of the scanning output produced from the image pick-up element 4 via the gate circuit 21. The output thus taken out is applied to the high frequency component detection circuit 22, which detects the high frequency component of the scanning output. The detection output of the detection circuit 22 is then sample-and-held by the sample-and-hold circuit 23 at every vertical synchronization.

With the picture-taking optical system 1–3 adjusted, when the optical system 1–3 is shifted from the above near-focus or far-focus condition to an in-focus condition, the output IF level of the comparison circuit 17 becomes high. As a result, the motor control circuit 18 stops the motor 19. At that instant, the output of the inverter 27, which has been at a high level, changes to a low level. Therefore, the flip-flop 26 is set. The level of the output $\bar{Q}$ of the flip-flop 26 changes from a high level to a low level and that of the output Q of the flip-flop 26 from a low level to a high level. With the level of the output $\bar{Q}$ having become low, operation of the light emitting element driving circuit 13 and the motor control circuit 18 are inhibited, stopping operation of the automatic focusing device 12–19. Furthermore, with the level of the output Q of the flip-flop 26 having become high, the one-shot circuit 29 produces a single pulse response. The pulse causes the memory circuit 24 to store the output of the sample-and-hold circuit 23 produced at that instant. This condition, i.e. the automatic focusing device 12–19 stoppage lasts until the picture-taking optical system 1–3 again becomes defocused, i.e. until the optical system 1–3 deviates from the allowable in-focus range preset by the resistors R1 and R2. In other words, the inoperative condition of the automatic focusing device continues until the output of the sample-and-hold circuit 23 becomes lower than the output level of the memory circuit 24 obtained through voltage division by the resistors R1 and R2. An image pick-up and/or video recording operation is then performed under that condition.

During the image pick-up operation under that condition, when the picture-taking optical system 1–3 deviates from the allowable in-focus range preset by the resistors R1 and R2, the output level of the sample-and-hold circuit 23 becomes lower than the output level of the memory circuit voltage divided by the resistors R1 and R2. Therefore, the output level of the comparator 25, which has been high, becomes low. As a result, the flip-flop 26 is reset via the OR gate 28. The level of the output $\bar{Q}$ of the flip-flop 26 again becomes high operating the light emitting element driving circuit 13 and the motor driving circuit 18. The automatic focusing device 12–19, therefore, again becomes operative performing an automatic focusing operation on the photo-taking optical system 1-3.

In this specific embodiment, as has been described above, the automatic focusing device is rendered inoperative when the picture-taking optical system 1-3 reaches an in-focus condition and then again becomes operative when the optical system 1-3 deviates from the in-focus condition. These processes are repeated during an image pick-u and/or video recording operation.

In this embodiment, the operation of the automatic focusing device 12-19 is stopped by inhibiting the light emitting element driving circuit 13 and the motor control circuit 18 from operating when an in-focus condition of the picture-taking optical system 1-3 is attained. This arrangement, however, may be replaced with an arrangement to inhibit the operation of the whole circuit of the automatic focusing device 12-19. In that instance, a switching transistor may be arranged in a power supply line of the whole focusing device circuit and on-and-off control over the switching transistor arrangement may be performed by the output $\overline{Q}$ of the flip-flop 26. However, it is solely the light emitting element 12 that causes high power consumption within the active type automatic focusing device 1-19. Therefore, sufficient high power can be saved by solely inhibiting the operation of the light emitting element 12.

Meanwhile, in this specific embodiment, the motor control circuit 18 is also inhibited along with the light emitting element driving circuit 13. This is mainly for the purpose of preventing an erroneous action, since the projection of the signal light is cut off under that condition. Accordingly, if some other means for preventing such an erroneous action is provided, the motor control circuit 18 does not have to be inhibited from operating.

In regard to control over the recording operation of the above recorder 11, though it is outside of the present invention, a trigger button of the camera may operate in a two-step depressing manner. The first step of the depressing operation on the trigger button may render the whole embodiment operative with the exception of the recorder 11, while the second step of the depressing operation may actuate the recorder 11. In another method of controlling the recording operation, the fall synchronizing type RS-flip-flop 34 is arranged, as indicated by a broken line in FIG. 1, to be reset by a power-up-clear pulse and to be set by a change of the above inverter 27 output level from high to low. Then, the output Q of the flip-flop 34 is applied to the recorder 11 as a recording control signal, allowing the recorder 11 to recard when the level of the output Q is high. An advantage of the latter control method is that the recorder 11 can be inhibited from recording before the picture-taking optical system reaches an in-focus condition for the first time.

Figure 4:
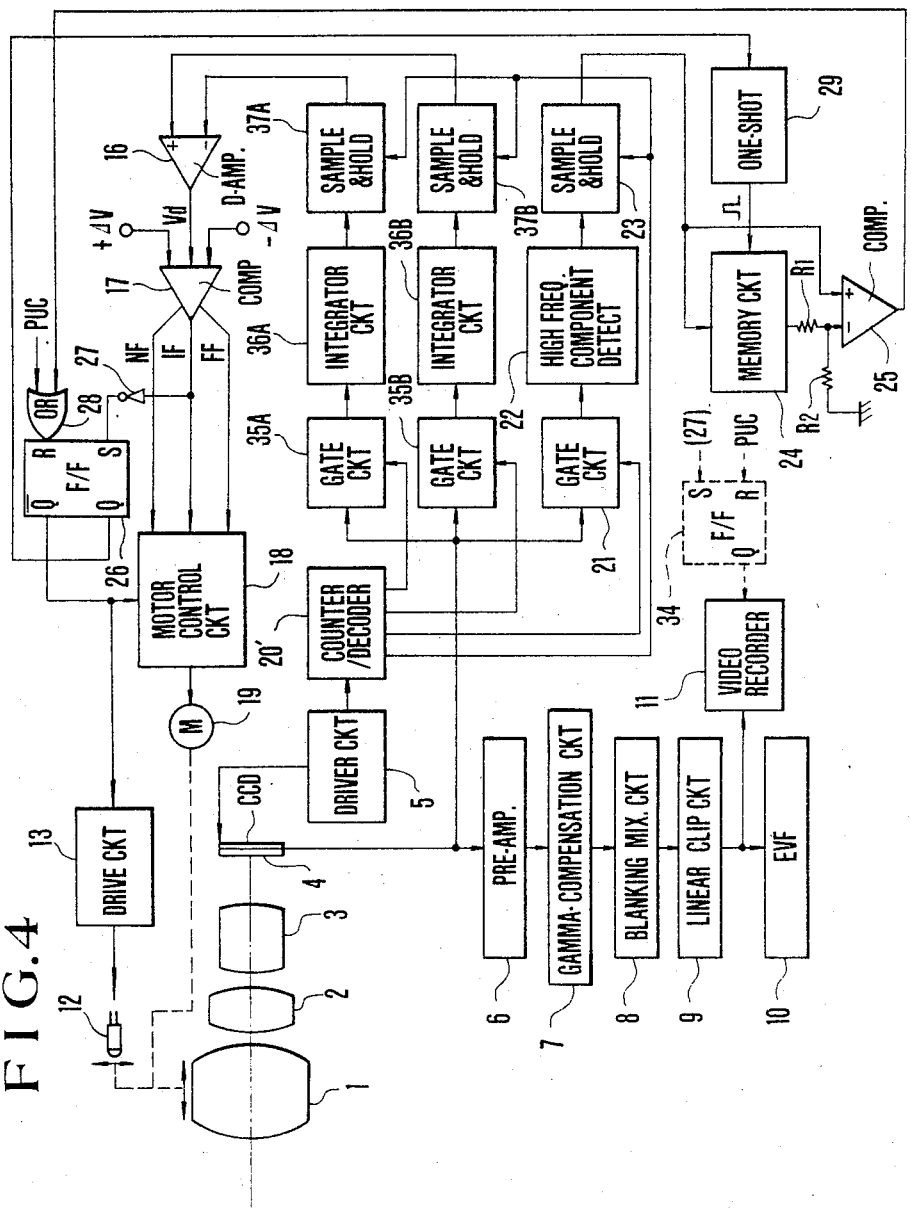
FIG. 4 is a block diagram showing the electrical circuit arrangement of a second embodiment of the invention.

A second embodiment of the invention is arranged as shown in FIG. 4. In FIG. 4, elements indicated by the same reference numerals and symbols as those used in FIG. 1 are identical with the corresponding elements used in the preceding embodiment. In the second embodiment, the light sensitive element 14, which is used for detecting a reflected light in the first embodiment, is replaced with a part of the image sensing surface 4a of the solid-state image pick-up element 4. This is a point in which the second embodiment differs from the first. Therefore, the following description mainly deals with the differences between the first and second embodiment, while the foregoing description of the first embodiment applies to the rest of the second embodiment.

Figure 5:
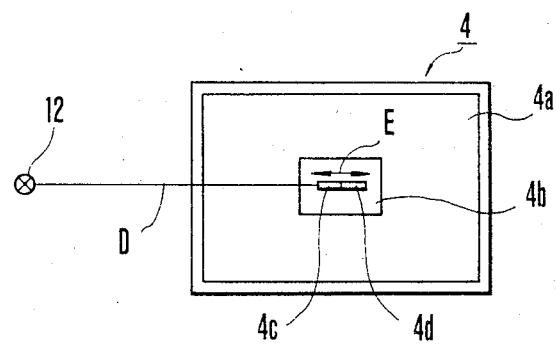
FIG. 5 is a schematic view showing detection regions on the image sensing surface of an image pick-up element provided for detection of a signal light and an out-of-focus condition of the arrangement of FIG. 4.

Referring to FIG. 4, gate circuits 35A and 35B are responsive to the output of a counter/decoder 20' and remove, from the scanning output of the image pick-up element 4, the output portions corresponding to the regions 4c and 4d of the image sensing surface 4a of the element 4 shown in FIG. 5. Integration circuits 36A and 36B respectively integrate the scanning outputs taken out by gate circuits 35A and 35B. Sample-and-hold circuits 37A and 37B are responsive to the output of counter/decoder 20' and are caused thereby sample-and-hold the outputs of the integration circuits 36A and 36B every time the image pick-up element 4 completes one scanning action, i.e. at every vertical synchronization. The outputs of the sample-and-hold circuits 37A and 37B are respectively supplied to the non-inversion and inversion input terminals of the differential amplifier 16.

Referring to FIG. 5, the regions 4c and 4d within the image sensing surface 4a cover the shifting range (indicated by a two-headed arrow E) within which the incident point of the reflected light shifts along a base line D provided between the light emitting element 12 and these regions 4c and 4d and are of the same length as the shifting range of the incident point. The width of the regions 4c and 4d may be at least a value corresponding to one scanning line. Therefore, these regions 4c and 4d correspond to the light receiving parts 14A and 14B of the light sensitive element 14 shown in FIG. 1. Meanwhile, the outputs of the sample-and-hold circuits 37A and 37B also correspond to the outputs of the amplifiers 15A and 15B shown in FIG. 1.

The rest of the arrangement of the second embodiment is exactly the same as in the first embodiment shown in FIG. 1. The operation of the second embodiment is also identical with that of the first embodiment with the exception of the following: After the signal light is projected from the light emitting element 12, the reflected signal light coming from the object to be photographed is detected by the regions 4c and 4d of the image sensing surface 4a and also by the elements in association therewith including circuits 35A - 36A - 37A and circuits 35B - 36B - 37B. Furthermore, in this embodiment, the detection region 4b in the image sensing surface 4a may coincide with the sum of the regions 4c and 4d.

The automatic focus control system 1-3 and a camera using the system are capable of greatly reducing power consumption through rational use of an active type automatic focusing device 1-19 despite the inclusion therein of the active type automatic focusing device 1-19 which intrinsically causes high power consumption. This is a great advantage, especially when the invention is applied to a motion picture camera, a video camera or the like that necessitates continuous operation of an automatic focusing device 1-19 during photography.

While an active type automatic focusing device of the infrared ray projecting type (particularly the differential type) is employed in the foregoing embodiments, the invention is, of course, not limited to use of the infrared ray projecting type. In accordance with the invention, the same advantageous effects are likewise obtainable from using focusing devices of many other active types such as those using an ultrasonic wave projection method including a phase detecting type, a radar type and the like.

What we claim:

1. An automatic focus control system for a focus adjustable optical means, comprising:
   (A) automatic focusing means of active type for automatically focusing said optical means relative to an object, said focusing means producing a first characteristic signal when the optical means reached an in-focus state relative to the object;
   (B) detecting means for producing a second characteristic signal when said optical means became in an out-of-focus state after the optical means has been adjusted in the in-focus state; and
   (C) control means responsive to said first and second characteristic signals for causing, in response to said first characteristic signal, said focusing means to stop its operation and for causing, in response to said second characteristic signal, the focusing means to restart its operation.

2. The system according to claim 1, wherein said automatic focusing means includes:
   a signal transmitter for transmitting a signal towards said object;
   a signal receiver for receiving the signal reflected by and coming from the object, said receiver producing an output in response to the received signal;
   a focus detecting circuit for detecting the focusing state of the optical means relative to the object on the basis of the output of said signal receiver, said detecting circuit producing an output indicative of the focusing state of the optical means relative to the object, said output of the detecting circuit including said first characteristic signal;
   a drive member for driving the optical means so as to adjust the focus thereof; and
   a focus control circuit for controlling said drive member on the basis of the output of said focus detecting circuit.

3. The system according to claim 2, wherein said control means is arranged to cause, in response to said first characteristic signal, said signal transmitter to stop its operation and to cause, in response to said second characteristic signal, the signal transmitter to restart its operation.

4. The system according to claim 3, wherein said control means is arranged to inhibit said focus control circuit in response to said first characteristic signal and to enable the focus control circuit in response to said second characteristic signal.

5. The system according to claim 3, wherein said control means is arranged to inhibit said drive member in response to said first characteristic signal and to enable the drive member in response to said second characteristic signal.

6. The system according to claim 1, wherein said optical means is adjustable so as to form an image of the object on a predetermined focal plane and said detecting means is arranged to detect, on the basis of the change in the degree of focus of said object image on said focal plane, that the optical means became in the out-of-focus state after the optical means has been adjusted in the in-focus state.

7. The system according to claim 6, wherein said detecting means includes:
   a first detecting circuit for detecting the degree of focus of said object image on said focal plane, said first detecting circuit producing an output indicative of said degree of focus of the image on the focal plane; and
   a second circuit for detecting, on the basis of the change in the output of said first detecting circuit, that said optical means became in the out-of-focus state after the optical means has been adjusted in the in-focus state, said second detecting circuit producing said second characteristic signal.

8. The system according to claim 7, wherein said second circuit is arranged to detect that the level of the output of said first detecting circuit became lower than a predetermined value which has been determined on the basis of the level of the output of the first detecting means when the optical means has been adjusted in the in-focus state.

9. The system according to claim 8, wherein said second detecting circuit includes:
   memory means for memorizing the output of said first detecting circuit when the optical means reached the in-focus state;
   threshold setting means for setting said predetermined value on the basis of the memorized output memorized in said memory means; and
   comparing means for comparing the output of said first detecting circuit with the predetermined value set by said threshold setting means, said comparing means producing said second characteristic signal when the output of the first detecting circuit became lower than the predetermined value.

10. The system according to claim 7, wherein said first detecting circuit is arranged to detect the sharpness of the image on said focal plane as said degree of focus of the image on the focal plane.

11. The system according to claim 6, wherein said detecting means is arranged to detect on the basis of the change in the sharpness of said object image on said focal plane, that the optical means became in the out-of-focus state after the optical means has been adjusted in the in-focus state.

12. An automatic focus control system for a focus adjustable optical means, comprising:
    (A) automatic focusing means of active type for automatically focusing said optical means relative to an object, said focusing means producing a first characteristic signal when the optical means reached an in-focus state relative to the object;
    (B) focus detecting means of passive type for detecting the focusing state of said optical means relative to the object, said detecting means producing a second characteristic signal when the optical means became in an out-of-focus state relative to the object; and
    (C) control means for controlling said focusing means on the basis of said first and second characteristic signals.

13. The system according to claim 12, wherein said control means is arranged to set said automatic focusing means in an inoperative condition in response to said first characteristic signal and to set the focusing means in an operative state in response to said second characteristic signal.

14. The system according to claim 12, wherein said automatic focusing means includes:
    a signal transmitter for transmitting a signal towards said object;
    a signal receiver for receiving the signal reflected by and coming from the object, said receiver producing an output in response to the received signal;
    a focus detecting circuit for detecting the focusing state of the optical means relative to the object on the basis of the output of said signal receiver, said detecting circuit producing an output indicative of the focusing state of the optical means relative to the object, said output of the detecting circuit including said first characteristic signal;

a drive member for driving the optical means so as to adjust the focus thereof; and a focus control circuit for controlling said drive member on the basis of the output of said focus detecting circuit.

15. The system according to claim 14, wherein said control means is arranged to control said signal transmitter on the basis of said first and second characteristic signals.

16. The system according to claim 15, wherein said control means is arranged to set signal transmitter in an inoperative condition in response to said first characteristic signal and to set the transmitter in an operative condition in response to said second characteristic signal.

17. The system according to claim 16, wherein said control means is arranged to control said focus control circuit on the basis of said first and second characteristic signals.

18. The system according to claim 17, wherein said control means is arranged to inhibit said focus control circuit in response to said first characteristic signal and to enable the focus control circuit in response to said second characteristic signal.

19. The system according to claim 16, wherein said control means is arranged to inhibit said drive member in response to said first characteristic signal and to enable the drive member in response to said second characteristic signal.

20. The system according to claim 12, wherein said optical means is adjustable so as to form an image of the object on a predetermined focal plane and said focus detecting means is arranged to detect, on the basis of the degree of focus of said object image on said focal plane, the focusing state of the optical means relative to the object.

21. The system according to claim 20, wherein said focus detecting means includes:

a first detecting circuit for detecting the degree of focus of said object image on said focal plane, said first detecting circuit producing an output indicative of said degree of focus of the image on the focal plane; and a second circuit for detecting, on the basis of the output of said first detecting circuit, that said optical means became in the out-of-focus state, said second circuit producing said second characteristic signal.

22. The system according to claim 21, wherein said second circuit is arranged to detect that the level of the output of said first detecting circuit became lower than a predetermined value which has been determined on the basis of the level of the output of the first detecting means when the optical means has been adjusted in the in-focus state.

23. The system according to claim 22, wherein said second detecting circuit includes:

memory means for memorizing the output of said first detecting circuit when the optical means reached the in-focus state;

threshold setting means for setting said predetermined value on the basis of the memorized output memorized in said memory means; and comparing means for comparing the output of said first detecting circuit with the predetermined value set by said threshold setting means, said comparing means producing said second characteristic signal when the output of the first detecting circuit became lower than the predetermined value.

24. The system according to claim 21, wherein said first detecting circuit is arranged to detect the sharpness of the image on said focal plane as the degree of focus of the image on the focal plane.

25. The system according to claim 20, wherein said focus detecting means is arranged to detect the focusing state of the optical means on the basis of the sharpness of the object image on said focal plane.

26. An automatic focus control system for a focus adjustable optical means, comprising:

(A) automatic focusing means for automatically focusing said optical means relative to an object, said focusing means producing a first characteristic signal when the focusing means has adjusted the optical means in an in-focus state relative to the object;

(B) supplementary focus detecting means for detecting the focusing state of said optical means relative to the object, said detecting means producing a second characteristic signal when the optical means became in an out-of-focus state relative to the object; and (C) control means for controlling said focusing means on the basis of said first and second characteristic signals; and wherein said control means is arranged to set said automatic focusing means in an inoperative condition in response to said first characteristic signal and to set the focusing means in an operative state in response to said second characteristic signal.

27. A camera comprising:

(A) focus adjustable optical means for picture taking;

(B) automatic focusing means of active type for automatically focusing said optical means relative to an object, said focusing means producing a first characteristic signal when the optical means reached an in-focus state relative to the object;

(C) detecting means for producing a second characteristic signal when said optical means became in an out-of-focus state after the optical means has been adjusted in the in-focus state; and (D) control means responsive to said first and second characteristic signals for causing, in response to said first characteristic signal, said focusing means to stop its operation and for causing, in response to said second characteristic signal, the focusing means to restart its operation.

28. A video camera comprising:

(A) focus adjustable image forming optical means;

(B) image pick-up means arranged to receive an image of an object formed by said optical means and to produce an image signal indicative of the scansion of the received image;

(C) automatic focusing means of active type for automatically focusing said optical means relative to the object, said focusing means producing a first characteristic signal when the optical means reached an in-focus state relative to the object;

(D) detecting means for detecting, on the basis of said image signal, that the optical means became in an outof-focus state relative to the object, said detecting means producing a second characteristic signal when detecting the out-of-focus state of the optical means relative to the object; and (E) control means for controlling said focusing means on the basis of said first and second characteristic signals.

29. The camera according to claim 28, wherein said control means is arranged to set said automatic focusing means in an inoperative condition in response to said first characteristic signal and to set the focusing means in an operative state in response to said second characteristic signal.

30. A video camera comprising:
(A) focus adjustable image forming optical means;
(B) signal transmitting means for transmitting a signal towards an object;
(C) image pick-up means for picking up an image of the object formed by the optical means and for providing an output indicative of the scansion of the object image, said output of the pick-up means including a component responding to the signal reflected by and coming from the object when said transmitting means is transmitting the signal towards the object;
(D) first detecting means for detecting the focusing state of the optical means relative to the object on the basis of said component of the output of said image pickup means, said first detecting means producing an output indicative of the focusing state of the optical means relative to the object, said output of the first detecting means including a first characteristic signal corresponding to an in-focus state of the optical means relative to the object;
(E) focus adjusting means for adjusting the focus of the optical means relative to the object on the basis of the output of said first detecting means;
(F) second detecting means for detecting, on the basis of the output of said image pick-up means, that the optical means became in an out-of-focus state relative to the object, said second detecting means producing a second characteristic signal when detecting the out-of-focus state of the optical means relative to the object; and
(G) control means for controlling at least said signal transmitting means on the basis of said first and second characteristic signals.

31. The system according to claim 30, wherein said control means is arranged to set said signal transmitting means in an inoperative condition in response to said first characteristic signal and to set the transmitting means in an operative state in response to said second characteristic signal.

32. The system according to claim 31 wherein said control means is arranged to set said focus adjusting means in an inoperative condition in response to said first characteristic signal and to set the adjusting means in an operative state in response to said second characteristic signal.

* * * * *